F. BURCKLE.
Pressure Gage.
No. 19,731. Patented March 23, 1858.
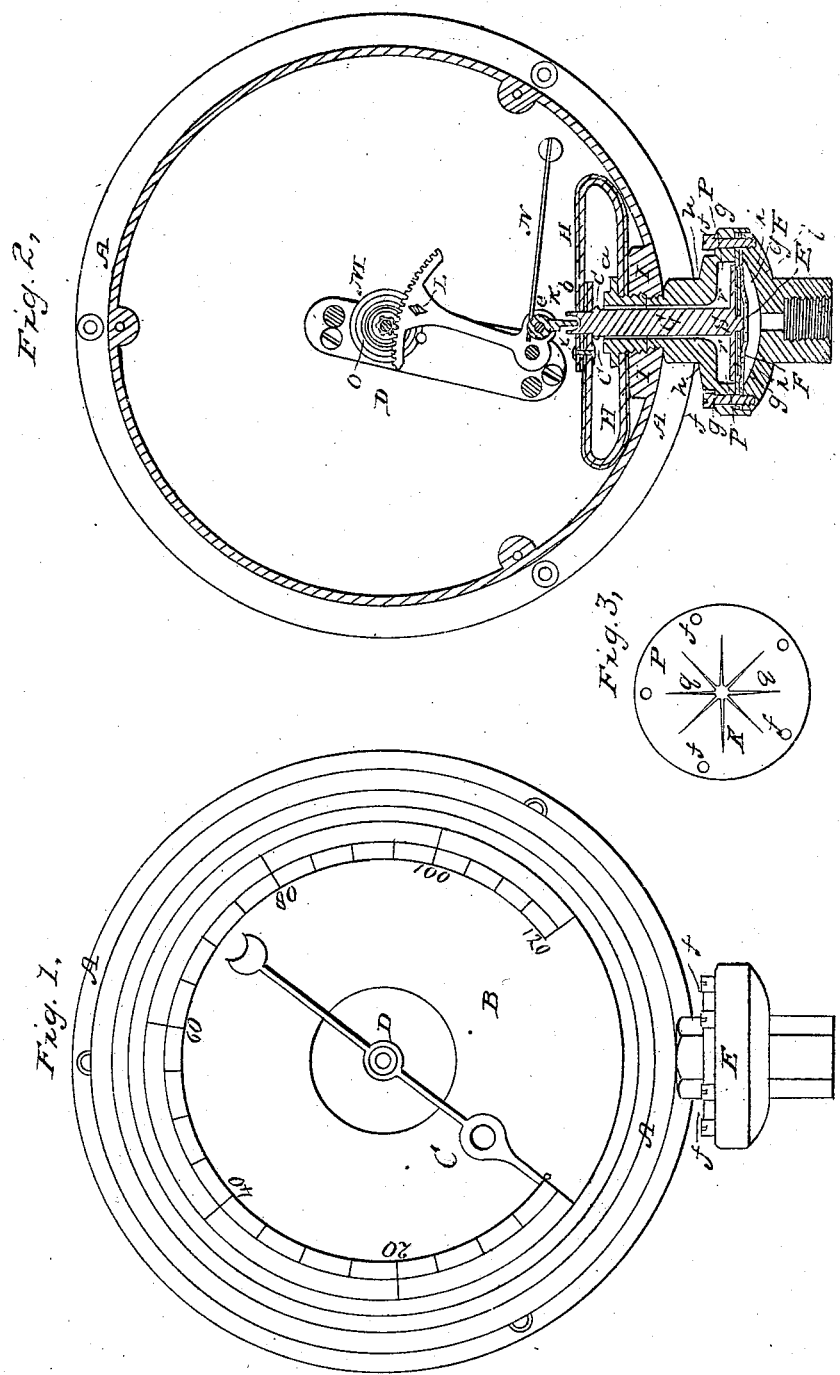

UNITED STATES PATENT OFFICE.

FRANZ BURCKLE, OF BOSTON, MASSACHUSETTS, ASSIGNOR TO EDWARD H. ASHCROFT, OF SAME PLACE.

STEAM-GAGE.

Specification of Letters Patent No. 19,731, dated March 23, 1858.

*To all whom it may concern:*

Be it known that I, FRANZ BURCKLE, of Boston, in the county of Suffolk and State of Massachusetts, have invented an Improved Steam-Pressure Gage; and I do hereby declare that the same is fully described and represented in the following specification and the accompanying drawings, of which—

Figure 1, denotes a front view of the said gage; Fig. 2, a longitudinal section exhibiting the operative parts within its case. Fig. 3, a top view of the metallic radial disk spring to be hereinafter described.

In these drawings, A, represents the case or box of the instrument as provided with a dial plate B and an index pointer or hand C, mounted on an arbor D, in the usual manner. Connected with this case A, and opening into the same is a diaphragm case or chamber E, across which an elastic diaphragm or partition F, is made to extend; the steam from a boiler, when the gage is applied to it being caused to press against the under side of the diaphragm, in order to give motion to a piston G, placed over it and connected with mechanism by which, during such movement of the piston, the arbor of the index hand will be put in rotation. These general principles of the pressure gage are common to others and well known. Furthermore, it is not new to apply a spring to the piston in order to insure a return movement of the said piston.

In Fig. 2, the mainspring of the piston is shown at H, it being of an elliptical or an approximately elliptical form, and fastened to the lower part of the rim of the case by means of a screw I, having formed through it, a passage $a$, made somewhat larger in diameter than the piston G; such piston being made to extend upward through the said passage and the upper leaf or half $b$, of the spring H, and to bear against the said upper part by means of a shoulder $c$, formed on the piston. A conical step $x$ is turned in the upper end of the piston such step being for the reception of the lower pointed end of a small pitman K, jointed to a projection $e$, from a toothed sector L, that engages with a pinion M, fixed on the arbor D. A spring N, arranged as shown in Fig. 2, rests and presses upon the upper end of the pitman K, and serves to maintain it in connection with the step of the piston during the downward movement of the latter. Furthermore, a spiral spring O, is attached to the arbor D, and the case A, is applied thereto so as to insure the correct action on the index pointer. Besides,— the mainspring H, applied to the upper end of the piston, there is another peculiar spring which is attached to or connected with the lower end of the piston, such spring being shown at P, in Fig. 2, and also in Fig. 3, and being termed the "metallic radial slit disk spring." It is constructed in the following manner; that is to say, it consists of a thin disk of spring steel or metal, having a diameter equal or about equal to that of the elastic diaphragm F, it being placed directly on the diaphragm, and affixed in place by the same means by which the diaphragm is fastened within its chamber, that is to say, both the diaphragm and the spring are secured in position by means of any suitable number of screws $f\ f$, being made to pass through them and flanches $g$, $g$, of the two parts $h$, and $i$, by which the chamber or diaphragm case is constructed, the screws serving to draw the parts closely together. From a hole $k$, in its center, the plate P, is slit radially as shown at $q$, $q$, $q$, in Fig. 3, and is connected with the piston G, by the said piston being extended through the hole $p$, and having two bearing plates or disks $r$, $s$, affixed to it and arranged on opposite sides of the spring as shown in Fig. 2. Thus the spring P, when in place in the diaphragm chamber, operates not only to centralize the lower end of the piston, but to facilitate the return movement of the piston under any relaxation of the pressure of the steam. Furthermore, one very important and particular object of the radial slit spring P, is to give support to the elastic diaphragm under any degree of tension thereof and thus prevent if from being ruptured or injured under any great and sudden expansion of the steam in the boiler. The elastic property of the radial slit spring admits of a very considerable extension of the elastic diaphragm, the spring at the same time operating as a safety guard to prevent its injury or rupture.

The peculiar application of the mainspring H, to the case and the piston, has advantages; for, by such, the spring is caused to operate by latitudinal extension under any increase of the pressure of the steam against the diaphragm. This is more conducive to the preservation of equality of action on the spring than when the spring is allowed to exert its greatest resistance under contraction of it. As the positions of the divisions on the index plate have to be determined by experiment and after the spring has been affixed in place, any change, thereafter, in the power of tension of the spring must render the divisions inaccurate indicators of the true pressure. A constant action or pressure tending to its collapse or contraction will soon more or less affect its expansive power; but by so applying the pressure that as it increases the spring shall expand there is not the danger of overstraining, weakening or injuring the spring, that occurs when the pressure tends to contract the elliptic spring in a transverse direction. Therefore by fastening the lower part of the spring to the case and having the piston play up through the fastening and press or bear against the upper half or part of the spring, we gain an advantage for the power of the spring is rendered more permanent. Another advantage resulting from the arrangement is that no partition is required to extend across the case to give support to the spring.

I do not claim so attaching the piston to an elliptic spring, that such piston shall be wholly supported by such spring, either with or without contact of the piston with the sides of the passage or space with in which the piston may move; nor do I claim connecting one end only of the piston to the spring. Nor do I claim supporting one end of a rod by a set of radial bars or toggles, while its other end is supported by a spring and the rod is carried through a tube as shown in the drawings of No. 13917 of United States patents, for in my mode of supporting the piston and keeping it from contact with the sides of the passage through which it extends, the radial disk spring not only performs the function of supporting the elastic diaphragm and centralizing the piston, but that of a spring to draw the latter downward under any relaxation of the pressure of the steam. Thus, in the steam pressure gage, the mode of supporting the two ends of the piston, viz, by such springs as above described effects a new and useful result, and differs from the mode of supporting a rod as shown in said patent 13917. Nor do I claim the employment of a collapsible hollow spring or combination of concavo convex springs, and their application to their case or frame and a pitman as shown in Grantoff and Albright's gage as described in the London *Mechanic's Magazine*, vol. 66, page 269, wherein the collapsible spring operates by lateral contraction on raising the pitman. The upper spring of the piston of my improved gage operates by latitudinal expansion in elevating the piston.

What I claim as my invention is as follows:

1. I claim supporting the upper end of the piston by the main spring, H, in combination with supporting the lower end of the said piston by a radial disk spring, applied to it and the elastic diaphragm and operating therewith substantially as described the same serving not only to centralize the piston during its movement or maintain it in a straight path and out of contact with the sides of the passage through which it plays, but to operate in other respects as herein before set forth.

2. I also claim fastening the main spring H, at the middle part of its inferior half with the lower part of the box or case and making the piston play through the fastening and abut against the upper half of the spring; the same causing the spring, under pressure of the steam against the diaphragm, to operate by latitudinal extension rather than by contraction and securing advantages as hereinbefore set forth.

In testimony whereof, I have hereunto set my signature.

FRANZ BURCKLE.

Witnesses:
F. R. HALE, Jr.,
E. H. ASHCROSS.